Dec. 14, 1948.    H. L. GIWOSKY ET AL    2,456,270
LUBRICATING DEVICE
Filed Nov. 5, 1943

Inventor
Harry L. Giwosky
By Peter Ketelsen
Reynolds + Beach
Attorneys

Patented Dec. 14, 1948

2,456,270

UNITED STATES PATENT OFFICE 2,456,270

LUBRICATING DEVICE

Harry L. Giwosky and Peter Ketelsen, Wichita, Kans., assignors to Boeing Airplane Company, Wichita Division, Wichita, Kans., a corporation of Delaware Application November 5, 1943, Serial No. 509,026

5 Claims. (Cl. 184—55)

Our invention relates to a lubricating device for air motors and air driven tools, which will automatically supply oil to the parts of such devices with which the air comes into contact.

While it has been proposed heretofore to lubricate air motors, air hammers, rock drills and the like with lubricant borne by the air supply, previous devices for feeding the oil into the air stream have been unsatisfactory in certain respects. Thus, for example, some have been intended for use only with certain types of air operated equipment; others for operation only in certain attitudes; and even when used in the manner intended they have been unable to supply lubricant in a form and at times during the operation of the equipment which would enable it to be utilized most effectively.

It is therefore a principal object of our lubricator to supply lubricant to the air stream continuously throughout the operation of the machine, but to regulate such supply so that an excessive or inadequate amount of oil will not be delivered to it at any time, even for intermittent or fluctuating operation. Also the oil received by the air stream from our lubricator will be transported in highly atomized form, as a mist distributed uniformly throughout the air stream, so that the oil will be dispersed thoroughly over the parts of the mechanism to be lubricated, for most effectively producing the desired film of lubricant between its relatively moving elements.

It is also intended that our lubricator be equally effective in different attitudes, while at the same time being light and compact, so that it is admirably suited for use with small portable tools as well as for heavy or stationary machines. Nevertheless its capacity is adequate for supplying sufficient lubricant to the air driven equipment over a substantial period of time, such as for several days of normal use of the equipment. Moreover, the quantity of lubricant delivered to the air stream will not vary appreciably whether the lubricator has been freshly filled with oil or has relatively little oil in it.

A further object of our invention is to supply oil to the air driven equipment generally in proportion to its need as determined not only by the period, but by the intensity of its operation. Thus, if the machine is operated at relatively high speed, utilizing a greater quantity of air to drive it, it will ordinarily require a greater quantity of lubricant for satisfactory functioning than when it is operated at a slower speed. Consequently the supply of oil to the air stream will be varied generally in proportion to the air demand. Such capability of thus regulating the oil supply automatically also renders our lubricator suitable for use with different machines of widely varying capacity, utilizing the same unit without requiring adjustment. Thus an air supply line with which our lubricator is associated may be connected selectively to different machines, or may lead to a number of machines which may or may not be used simultaneously, yet each will be lubricated appropriately while it is being operated irrespective of the simultaneous operation of some or all of the other machines supplied with air by such line.

Furthermore our lubricator is of simple and inexpensive construction, incorporating no moving parts, and hence is durable and reliable in operation. In addition it incorporates no minute orifices which must be cleaned frequently, yet all its parts are readily accesible for servicing when necessary.

All these advantages are achieved without appreciably restricting or retarding the flow of air from the source of supply to the equipment to be driven, and no special fittings or appreciable alteration of the air supply equipment is required for the adaptation of our lubricator to present compressed air systems.

It may be desirable for certain installations to vary some details of the examples of our lubricator shown in the drawings, but its important features, as defined in the appended claims, will be understood from the following description of typical constructions.

Figure 1:
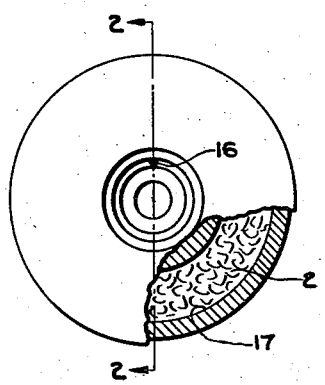
Figure 1 is an end elevation view, with parts broken away, of one form of our oiler.

Both forms of our lubricator illustrated are intended to be connected directly in an air supply line between a source of air under pressure and the equipment to be driven, whether it be a rotary or reciprocating air motor, or a tool, such as a hammer, a squeeze riveter, or the like. The lubricator, which may include a generally cylindrical case or barrel 1 integral with one end wall 10 and having a cap 11 closing its other end, has air line connections in its opposite ends, such as threaded sockets 12 into wich may be screwed complementally threaded air hose fittings. One of these sockets is formed in the end wall 10 and the other in cap 11.

In addition each end of the oiler has an inwardly projecting hollow thimble integral with it, which thimbles are threaded complementally for interconection by relative rotation of the cap and barrel. These thimbles cooperate to form a straight and unobstructed tubular core interconnecting the air hose sockets 12, through which the major portion of the air stream flows without being impeded or diverted. In addition these interengaged thimbles constitute a coupling for securing the cap and the case together. It is largely immaterial which thimble is threaded externally and which internally, but in the form shown the externally threaded thimble 13, having the axial bore 14, is formed on the end wall 10 integral with the barrel 1, whereas the complemental internally threaded thimble 15 projects from the cap 11.

The precise location of the interengaged threaded portions of the thimbles between the lubricator ends is not of great importance, but preferably they are disposed generally centrally between the end wall 10 and cap 11. Through the wall of each of the thimbles 13 and 15, near its base, is drilled a small hole 16 between the end wall and the portion of the thimble threaded for connection with the other thimble. Such apertures preferably are inclined toward each other to dispose their ends opening into the common annular chamber 17 between the hollow core and the cylindrical casing wall closer together than their ends opening into the air line sockets 12. The holes are thus rendered readily accessible from such sockets for cleaning, when necessary, without disassembling the lubricator.

The annular chamber 17 is substantially filled with a filler ring 2 of fibrous absorptive material, such as cotton. This filler may be made of bulk material but preferably is of serpentine villous structure, such as wire strung cotton, smoking pipe cleaner stock, folded sinuously. It serves the dual purpose of a storage medium, when saturated with lubricating oil, and of a contact element for feeding oil to the air stream. A filling hole 18 extending radially through the wall of the cap thimble 15 near end wall 11 affords communication between the cap socket 12 and the annular chamber 17 for supplying oil to the filler 2 when the hose connection is disengaged from the cap socket. This hole is sealed by the hose fitting when the lubricator is connected in the air line.

The procedure for assembling our lubricator is very simple. Into the annular chamber 17 is slipped the filler ring 2 encircling the thimble 13 integral with the barrel 1. A gasket ring 19 is placed over the cap thimble 15 and fitted about the cap flange. Then the cap is placed over the open end of the case and rotated so that the thimbles are screwed together until the cap is drawn tightly against the barrel end.

After the lubricator has been assembled it may be set on its cap 11 in a pan containing oil to a depth sufficient to submerge filling aperture 18. Oil flowing through this hole will be absorbed gradually by the filler until it is saturated. The oiler is now ready to be connected in the air line for use. Since it is substantially symmetrical about its central plane it is immaterial which end is connected to the air supply line. The fittings must not be screwed into sockets 12 far enough to cover holes 16.

As air now flows through the lubricator the larger part of the air stream will pass straight through the core bore 14. A small part of the air, however, will be by-passed through the filler 2 in the annular chamber 17, by way of holes 16, but in such passage this portion of the air stream will be deflected only slightly from the main path. The proportion of the air flowing through this branch passage will, of course, depend upon the size, as well as the number, of holes 16. While ordinarily a single hole in each thimble will be sufficient, for equipment requiring extraordinary lubrication several sets of holes 16 may be spaced circumferentially about the thimbles.

As the air flows through the lubricator the by-passed portion entering chamber 17 will pick up oil from the section of the filler 2 between the inflow and outflow holes 16. When this air flows back into the air line, therefore, it will be saturated with oil, and since it merges with the main air stream at an angle, the oil laden air will be dispersed throughout the air stream to distribute the oil through it as a very fine mist.

Since both inflow and outflow holes are freely open at all times a constant auxiliary flow of air through the filler in chamber 17, which is essentially proportional to the total air flow through the lubricator and varies with such flow, is maintained continuously. Delivery of oil to the air stream ceases, of course, while air is not flowing through the lubricator, and when the flow of air commences again the amount of oil delivered will be substantially the same, for however long or brief a period the air flow may have been interrupted.

As the oil is removed from a particular section of the filler by flow of air therethrough it is continually replenished with oil brought to such section from the remainder of the filler by capillary attraction. No matter how long flow of air may continue, therefore, the air stream will be supplied continuously with oil. Also as long as the filler is reasonably thoroughly impregnated with oil the amount picked up by a given quantity of air by-passed through the chamber 17 will be substantially equal at all times. When the oil in the filler is too greatly depleted the lubricator may easily be refilled by disconnecting it from the air line and again standing it on the cap 11 in a pan of oil, as explained previously.

It will be seen that a lubricator of this type is excellently suited for use with small portable air driven tools, because there is no pool of oil which could be emptied into the air line whatever position the lubricator may assume. Moreover the rate of oil feed in all positions will be virtually the same. The capacity of the lubricator may be varied without forfeiting this advantage merely by making the case longer or of larger diameter. Ordinarily, however, only machines of the stationary type require more lubricant than can be supplied for a substantial period by a lubricator of the type described of reasonably small size.

While even for stationary machines it is highly desirable that a continuous supply of lubricant in atomized condition be afforded, it is usually not essential that the lubricator be capable of functioning indifferent attitudes. For stationary machines, therefore, the type of lubricator shown in Figures 3 and 4 may be employed, which possesses all the advantages of the form described above, with the exception that it is not capable of being used satisfactorily in very position. Instead, however, the oil storage capacity of this modified lubricator of comparable size is much greater than that of the first form.

The alternative lubricator illustrated has a case 1 defining an internal annular chamber 17, just as in the other lubricator, but the lower portion of the barrel is enlarged to form a reservoir chamber 3, to accommodate a pool of lubricating oil. Since this reservoir cannot be filled in the manner described for our other type of lubricator, a separate filler opening is provided in a boss 30 projecting from the side of the reservoir. The filling hole may be closed by a screw cap 31. Oil may be poured into this hole, of course, without disconnecting the lubricator from the air line.

In order to feed oil from this reservoir to the filler 2 a ribbon 20 of absorbent material, serving as a wick, is draped from the filler proper down into the oil in the reservoir. The filler is thus kept saturated with lubricant drawn upward from the reservoir by capillary attraction, regardless of the height of the oil in the reservoir.

Figure 2:
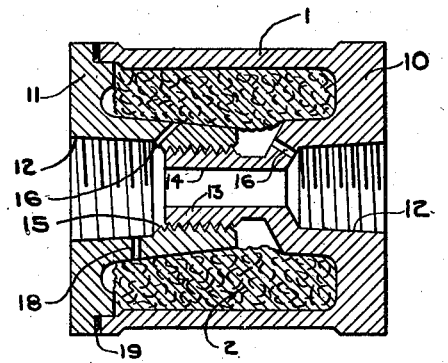
Figure 2 is a transverse section of it on line 2—2 of Figure 1.
Figure 3:
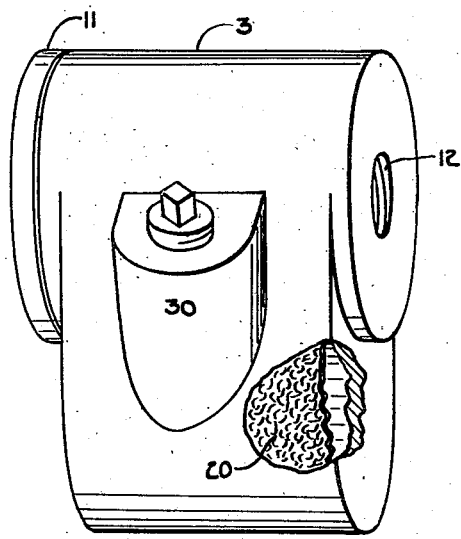
Figure 3 is a perspective view of a modified type of lubricator, parts being broken away.
Figure 4:
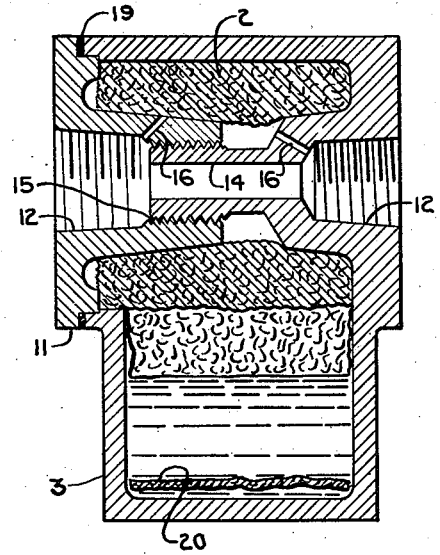
Figure 4 is a longitudinal vertical section through it.

The method of assembling the lubricator of Figures 3 and 4, and the manner in which it operates, are precisely the same as in the case of the lubricator of Figures 1 and 2, which was described above.

We claim as our invention:

1. A lubricator comprising a barrel, a tubular core extending through said barrel defining a main air passage and adapted to receive in one end thereof a tube for connecting the lubricator in an air line, said core and said barrel cooperating to define an annular chamber therebetween, and an oil-impregnated absorbent filler received in such annular chamber, the core wall having small holes therethrough, defining a by-pass branch passage from the bore of said core through said filler and back into the core bore for flow of a portion of the air stream through a section of said filler, to pick up atomized oil therefrom and to deliver such oil laden air at an angle into that portion of the air stream flowing through the tubular core, and the core wall further having a filling hole, for supplying oil to said filler, between one of the aforesaid holes and the core end nearer thereto, such filling hole adapted to be closed by the air line connecting tube inserted in the tubular core.

2. A lubricator comprising a barrel, an end wall formed integrally therewith, a tubular thimble integral with said end wall and projecting concentrically within said barrel, a cap defining a second end wall for said barrel and having a tubular thimble integral therewith, projecting toward said first thimble, and detachably connected with said first thimble to hold said end walls in assembled relationship and to form a hollow core extending through said barrel, constituting a main air passage, and defining with said barrel an annular chamber, means for attaching air lines to said thimbles, and an oil-impregnated absorbent filler received in such annular chamber, each thimble having a small aperture through its wall to afford communication between its interior passage and the annular chamber receiving said filler, to by-pass through the filler a portion of the air flowing through the lubricator to pick up oil from the filler and to deliver it to the air stream flowing through the hollow core.

3. A lubricator comprising a barrel, an end wall formed integrally therewith, a tubular thimble integral with said end wall and projecting concentrically within said barrel, a cap defining a second end wall for said barrel and having a tubular thimble integral therewith, one of said thimbles being threaded externally and the other internally for complemental mutual engagement to secure said cap to said barrel, forming a hollow core extending through said barrel, constituting an unobstructed, straight main air passage, and defining with said barrel an annular chamber, the outer ends of said thimbles being threaded internally for receiving therein fittings for connection in the lubricator air line, an oil-impregnated absorbent filler received in such annular chamber, each thimble having an air bleed hole through its wall at the inner end of its internally threaded portion and inclined toward the outer end of such internally threaded portion, such bleed holes, together defining a by-pass branch passage from the bore of said core through said filler and back into the core bore, for flow of a portion of the air stream through a section of said filler to pick up atomized oil therefrom and to deliver such oil laden air into that portion of the air stream flowing through the hollow core in a direction converging with such air flow through the core, and one thimble having through its wall a filling hole, for supplying oil to said filler, located to be closed by the air line fitting threaded in such thimble.

4. A lubricator comprising a barrel, a tubular core extending through said barrel at a location eccentrically of its center, defining an unobstructed main air passage, and having means for connecting the lubricator in an air line, said core and said barrel cooperating to define an annular chamber therebetween, such chamber below the core being of considerably greater extent perpendicular to the core than at the other sides thereof, to define an oil reservoir below the core, said barrel having in its side a filling opening for such reservoir, an oil-impregnated absorbent filler received in such annular chamber above the reservoir, a wick draped from said filler down into the reservoir, and means defining a by-pass branch passage from the bore of said core through said filler and back into the core bore for flow of a portion of the air stream through said filler to pick up atomized oil therefrom and to deliver it to that portion of the air stream flowing through the tubular core.

5. A lubricator comprising a circular end wall having therein a central aperture, and a second end wall having therein an aperture in registry with such central aperture of said first end wall, an imperforate barrel element carried by said second end wall and adapted for endwise abutment with said first wall, a tubular thimble also carried by said second end wall in registry with the aperture thereof, and projecting therefrom in the same direction as said barrel element, a second thimble carried by and projecting from said first end wall toward said second end wall, and registering with the aperture in said first end wall, said first thimble being threaded externally and said second thimble being threaded internally for complemental mutual rotative engagement to draw said end walls toward each other, for moving said element into abutment and for holding it and said first end wall in assembled relationship, said thimbles cooperating in forming a hollow core extending through the barrel, constituting an unobstructed straight main air passage, and defining between such core and said barrel element an annular chamber, and an oil-impregnated absorbent filler received in such annular chamber, each thimble having a small aperture through its wall to afford communication between its interior passage and the annular chamber receiving said filler, and inclined from such chamber toward the end wall supporting the respective thimble and toward the center of such thimble, to by-pass through the filler a portion of the air flowing through such hollow core to pick up oil from the filler and to deliver it to the air stream flowing through the thimbles generally in the direction of such flow.

HARRY L. GIWOSKY.
PETER KETELSEN.

REFERENCES CITED

The following references are of record in the file of this patent:

UNITED STATES PATENTS

| Number | Name | Date |
|---|---|---|
| 810,621 | Cooper | Jan. 23, 1906 |
| 1,154,353 | Wakefield | Sept. 21, 1915 |
| 1,177,713 | Leonard | Apr. 4, 1916 |
| 1,594,944 | Hansen | Aug. 3, 1926 |
| 1,605,434 | Hansen | Nov. 2, 1926 |
| 2,229,176 | Kehle | Jan. 21, 1941 |

FOREIGN PATENTS

| Number | Country | Date |
|---|---|---|
| 320,452 | Germany | Mar. 26, 1918 |
| 375,823 | Great Britain | July 1, 1932 |
| 492,120 | Germany | Feb. 17, 1930 |